Oct. 28, 1958  F. W. FENTON ET AL  2,858,043
PALLET DISPENSERS
Filed June 21, 1954  3 Sheets-Sheet 2

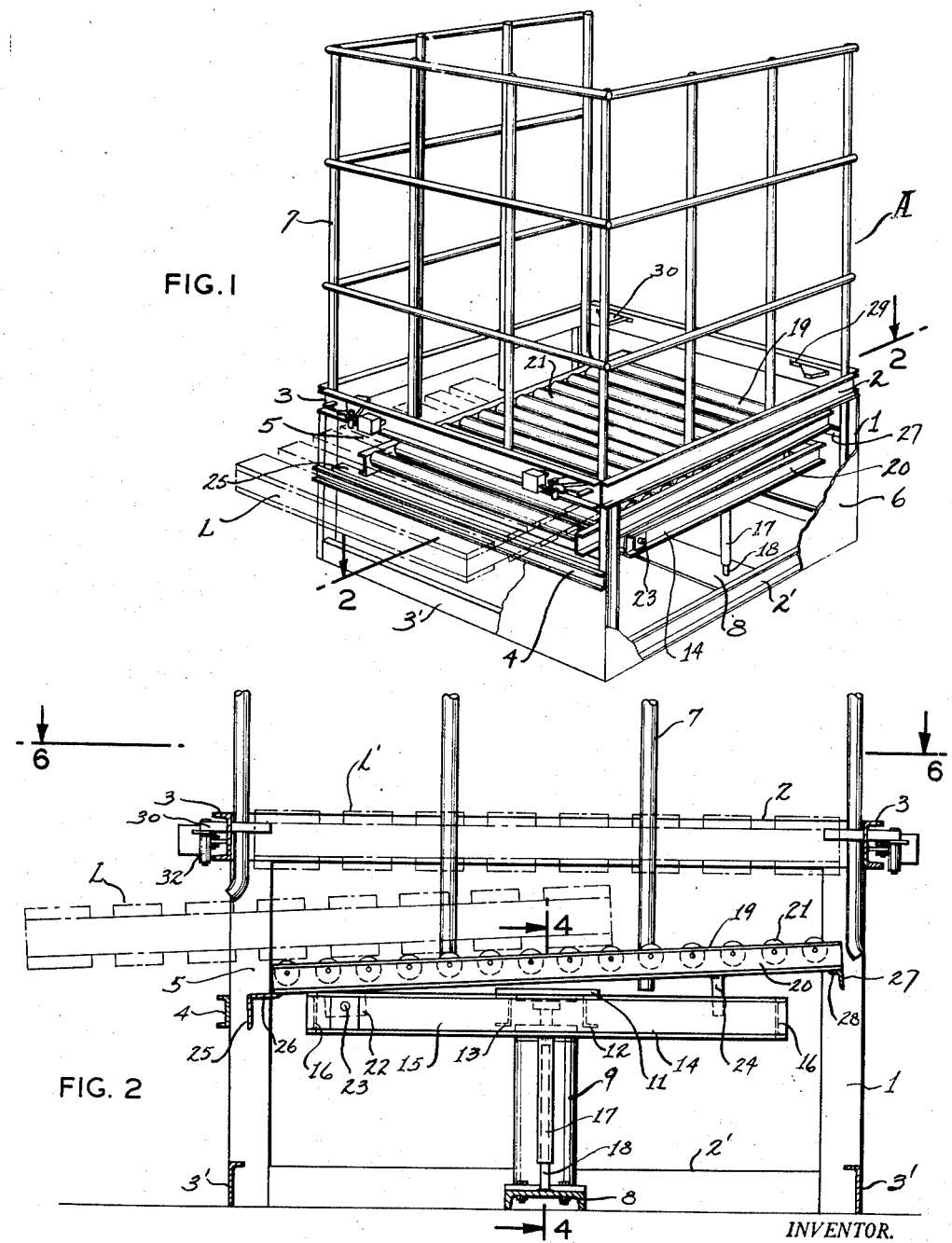

INVENTOR.
FRANK W. FENTON AND HAROLD L. BOCK
BY Ralph W. Kalish

ATTORNEY

Oct. 28, 1958   F. W. FENTON ET AL   2,858,043
PALLET DISPENSERS

Filed June 21, 1954   3 Sheets-Sheet 3

INVENTOR.
FRANK W. FENTON AND HAROLD L. BOCK
BY
Ralph W. Kalish

ATTORNEY

United States Patent Office 2,858,043
Patented Oct. 28, 1958

2,858,043

PALLET DISPENSERS

Frank W. Fenton, St. Louis, Mo., and Harold L. Bock, Greenwood, Ind., assignors to Beacon Production Equipment Corporation, Centreville Township, Ill., a corporation of Illinois Application June 21, 1954, Serial No. 437,968

2 Claims. (Cl. 221—9)

This invention relates in general to dispensers and, more particularly, to a machine for storing and dispensing unloaded pallets.

The usefulness of loading pallets in myriad types of industrial plants is well recognized. In many industries the pallet is currently indispensable as a material handling expedient and firms using extensive numbers of pallets have found that maintenance of same constitutes a costly item of overhead. The frequent replacement of pallets which have become unusable through rough handling or the repair of slightly damaged pallets by incorporation therein of new deck boards or stringers are annually occasioning increasing expense to many industrial users. A primary cause for pallet damage is the fact that the same are not customarily stored in convenient, yet unobtrusive locations, but are stacked or spotted indiscriminately throughout a plant. Without being properly stacked, in a protected manner, the pallets are exposed for damage by trucks and other mobile agents in a plant. Furthermore, the lack of orderly storage of pallets causes considerable uneconomical inconvenience to a plant at such times as the same are required for loading purposes.

With pallets scattered throughout a plant, workmen demonstrate little care in handling same and roughly misuse the pallets in removing them from an operating area upon unloading or in providing same for loading. Consequently, through such careless treatment, the life of each pallet is markedly reduced with expected increase in expense of maintenance. With unloaded pallets compactly stored in stacked formation, maximum economy in plant space may be effected, as minimum floor area will be demanded. Such orderly storage will release valuable square footage for productive purposes, as well as protect the pallets against damage. Furthermore, to facilitate pallet loading operations, a handy supply of pallets should be provided by a convenient pallet depository, with attendant economy in handling.

Therefore, an object of this invention is to provide a machine which incorporates means for storing a supply of empty pallets in stacked relation and is adapted to dispense pallets singly from such stack.

Another object of this invention is to provide a machine for dispensing unloaded pallets which is adapted to remove and discharge pallets individually from the bottom of a supply stack retained in the machine.

Another object of this invention is to provide a pallet dispensing machine which may be placed at any desired point within a plant and may be utilized with a conveyor system for readily providing pallets to any selected location within the plant.

A further object of this invention is to provide a pallet storing and dispensing machine which is durable and reliable in operation; which is economical in construction; which may be used for storing empty pallets; and the use of which will protect pallets against damaging handling with consequent material increase in the lives thereof.

These and other detailed objects are obtained by the structure illustrated in the accompanying drawings (three sheets) in which:

Figure 1 is a perspective view of a pallet dispensing machine constructed in accordance with and embodying the present invention.

Figure 2 is a vertical transverse section taken along line 2—2 of Figure 1 showing the carriage in lowered position.

Figure 3:
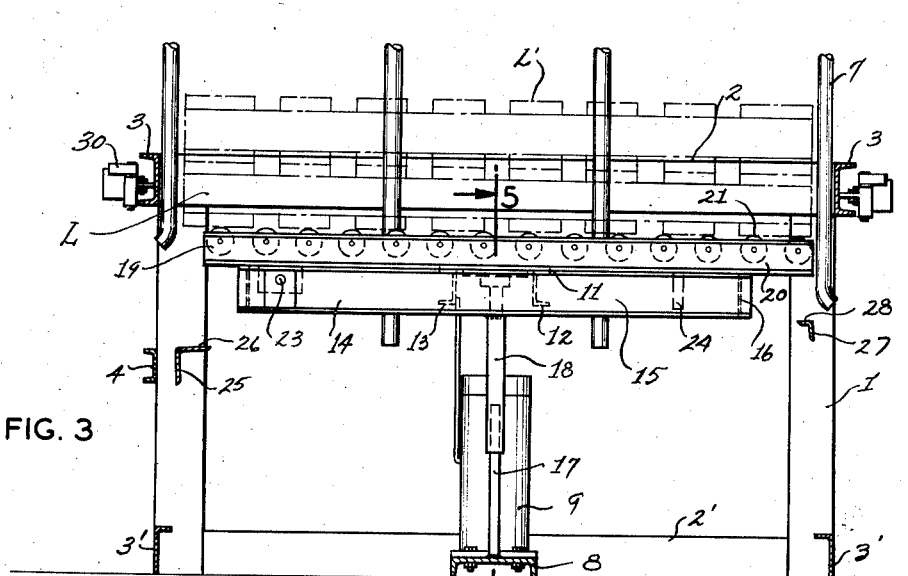
Figure 3 is a vertical transverse section taken substantially on line 2—2 of Figure 1 showing the carriage in fully raised position.

In the accompanying drawing, A designates a pallet dispensing machine having a generally rectangular base frame comprised of upright corner members 1, interconnecting upper and lower side members 2, 2', and forward and rear upper and lower transverse members 3, 3', being constructed of channel and angle stock. Provided spacedly downwardly of front upper transverse member 3 is an intermediate cross member 4 for cooperating therewith to define therebetween a discharge opening 5 extending the width of the base frame. Metallic sheets 6 are secured to the various members of the base frame for enclosing same. Supported on the base frame, and projecting upwardly therefrom, is a three-sided magazine or hopper-defining frame 7, which is of lattice character, being comprised of vertical and horizontal rods, pipes, or other suitable stock. It will be noted that frame 7 does not extend along the rear side of dispenser A which is thus open above the base frame, to permit access to the magazine for loading purposes, as will appear more fully below.

Extending between lower side members 2' and secured at its ends thereto, as by welding, is a narrow base plate 8 centrally upon which is mounted a vertically presented power cylinder 9, as of the pneumatic or hydraulic type, having a piston rod 10 entering same through its upper end or head. Fixedly secured at the upper end of piston rod 10 is a plate 11 rigid on its under surface with a pair of spaced, transversely extending, channel-shaped brace members 12, 13, of the frame of a carriage or elevator 14, being rectangular and having lateral members 15 and forward and rear end members 16, the latter being parallel with brace members 12, 13. Secured substantially intermediate each side member 15 and depending vertically from the lower flange thereof is a tubular guide member 17, each for relative telescopic movement with respect to a cooperating guide post 18, said posts 18 being welded at their lower ends to base plate 8 and upstanding therefrom. Thus, carriage 14 may be raised and lowered within the base frame enclosure responsive to action of fluid cylinder 9, as described hereinbelow, with each guide member 17 riding upwardly and downwardly along the related guide post 18 to prevent any inadvertent lateral displacement of carriage 14 during operation.

Disposed for movement by carriage 14 is a conveyor platform 19 comprising channel-shaped side elements 20 within which are journaled the ends of a plurality of horizontally spaced apart rollers 21. Conveyor platform 19 is of relatively greater length than the frame of carriage 14. Integral with, and depending from, each side element 20 adjacent its forward end is a lug 22 apertured for fixedly receiving a hinge pin 23 which is suitably journaled for rotation in side members 15 of carriage 14 whereby said pins 23 provide pivots for swingability of conveyor platform 19 with respect to carriage 14. Also projecting downwardly from each side element 20, but adjacent its rearward end, is a short guide rod 24 for disposition inwardly of the adjacent side member of carriage 14 to prevent unauthorized lateral displacement of conveyor platform 19.

Extending across the front portion of the base frame of machine A immediately inwardly of, substantially parallel to and aligned with, cross member 4 is an angle member 25 with one of its flanges 26 forming the bottom of discharge opening 5 and being presented at a slight angle to the horizontal so as to incline forwardly and downwardly. Across the rear of the base frame is a transverse angle member 27, being presented a predetermined distance above angle member 25, and disposed so that its horizontal flange 28 will incline slightly forwardly and downwardly. With reference now being made to Figure 2, it will be seen that when carriage 14 is in fully lowered position the forward end of conveyor platform 19 will be supported on flange 26 of angle member 25 and the rearward end thereof will rest on upper angle member 27 whereby, due to the height differential between same and the inclination of the horizontal flanges thereof, platform 19 will be inclined downwardly and forwardly toward discharge opening 5 to provide for gravity flow purposes. As carriage 14 is raised, it will gradually lift conveyor platform 19 from its supports 25, 27, to cause same to be fully carried on carriage 14, as by resting of side elements 20 upon brace members 12, 13, wherein it will be horizontally disposed as it is carried above support 27 and returned thereto on downward travel of carriage 14. Therefore, as carriage 14 continues downwardly, the rearward end of platform 19 is arrested by angle member 27, the forward end being carried until it abuts on angle member 25, which abutment will coincide with the downward limit of travel of carriage 14. Provided in both upper, forward and rearward transverse members 3 of the base frame is a pair of spaced apart openings 29 for extension therethrough of pallet retaining lugs 30 which are flat and have general wedge contour with the enlarged portions normally projecting within the interior of the base frame. Each lug 30 is securely engaged on its outer narrower end upon a pin 31 received within a bearing bracket 32 welded to transverse members 3 whereby lugs 30 are rendered pivotal thereabout. Rigid with each lug 30, adjacent its outer end is a projection 33 to which is engaged one end of a coil spring 34 having its other end connected to an ear 35 welded on transverse members 3; said springs 34 biasing lugs 30 into inward or operative position for pallet retaining. Swingably fastened to projection 33 on the opposite side thereof from the point of attachment of spring 34 is one end of the armature 36 of a solenoid 37 mounted on members 3 by brackets 38. The four solenoids 37 are in circuit (not shown) with a limit switch 39, preferably of the snap-action type, connected to a source of electricity, and mounted upon an upright post 40 secured at its lower end to base plate 8 proximate one guide post 18. Limit switch 39 includes a switch arm having an enlarged, cam-forming head 41 for cooperation with a cam 42 mounted upon the adjacent guide tube 17 by brackets 43. Cam 42 comprises a substantially elongated, vertical operating surface or edge 44 which at its lower end is continuous with an outwardly and downwardly inclined operating surface 45. Also mounted upon the same tubular guide member 17 spaced beneath lower end of cam 42 is an abutment member 46 extending inwardly toward post 40 a short distance beyond the operating edge of cam 42 to present its upper surface for contacting head 41 of the switch arm.

Under the influence of coil springs 34, pallet retaining lugs 30 will normally be in operative position for supporting upon their upper surfaces a stack of loading pallets within the magazine or hopper of machine A. For purposes of illustration, only two pallets are indicated in dotted lines in the drawings, the lowermost being designated L and the one above being denoted L'. It is understood that the magazine will normally hold pallets stacked in superimposed relation to a height at least as great as the top of the upper guard rail. Lugs 30 will engage the lowest pallet of the stack by bearing against the under surface of its top deck boards, and hence single-face or double-faced pallets can be accommodated. Referring to Figure 3, it will be noted that when carriage 14 is in full raised position, conveyor platform 19 will be presented against the under surface of the bottom pallet L, which may be the lower deck or stringers, depending upon the type pallet.

Figure 4:
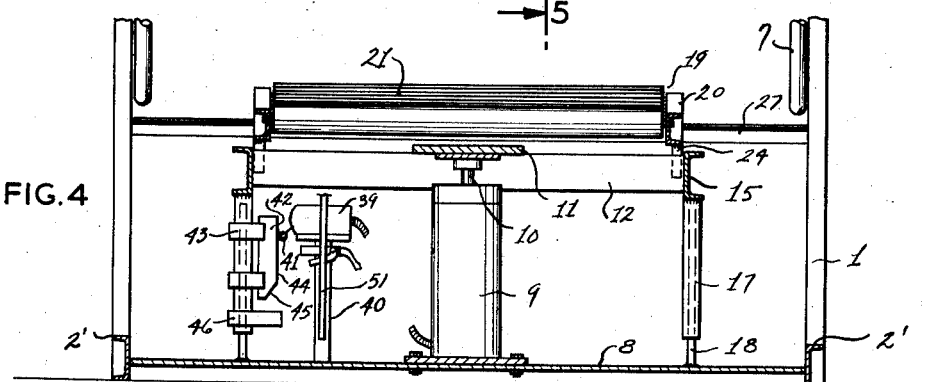
Figure 4 is a vertical transverse section taken on line 4—4 of Figure 2.
Figure 5:
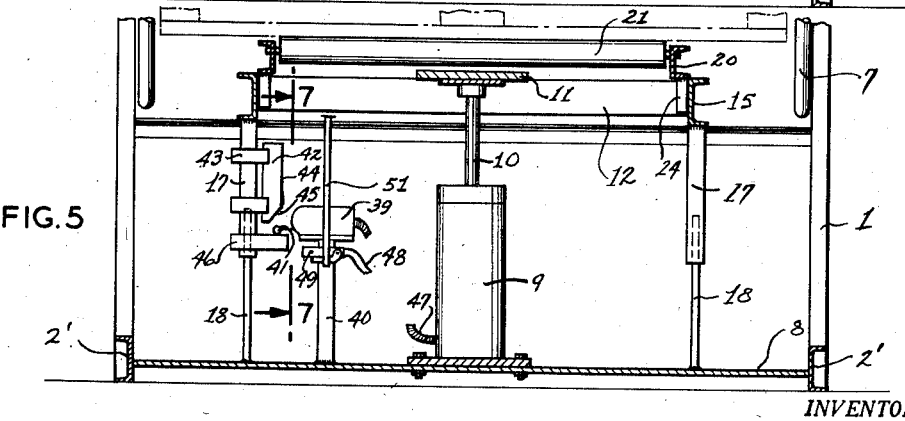
Figure 5 is a vertical transverse section taken on line 5—5 of Figure 3.
Figure 6:
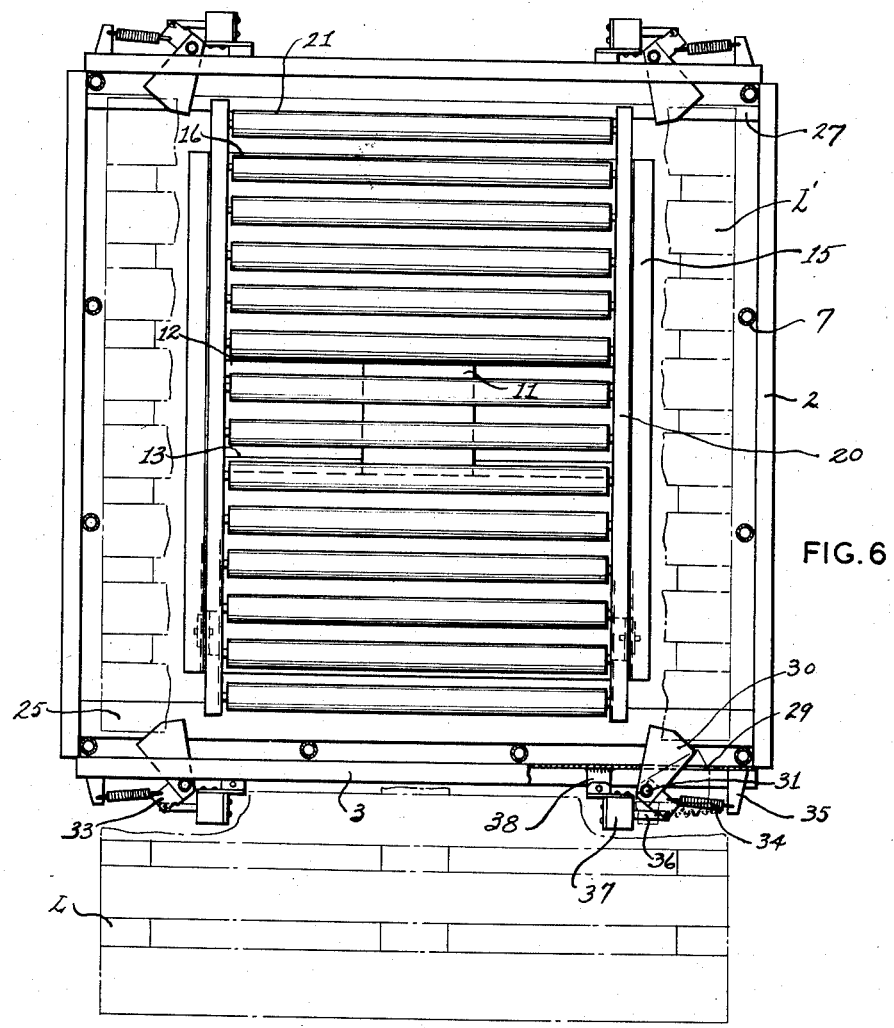
Figure 6 is a horizontal transverse section taken on line 6—6 of Figure 2.
Figure 7:
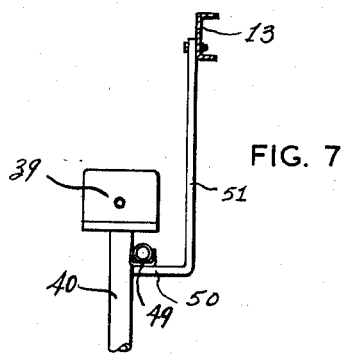
Figure 7 is a vertical transverse section taken on line 7—7 of Figure 5.

As best seen in Figure 5, the switch arm of limit switch 39 will be in substantially horizontal position when switch arm head 41 is in contact with the upper surface of abutment member 46. In this position, limit switch 39 is closed so that solenoids 37 are energized to cause retraction of the associated armatures 36 whereby lugs 30 are swung outwardly into the position shown in dotted lines in Figure 6, away from supported engagement of the pallet stack whereby the latter is then fully received upon conveyor platform 19 and, in effect, supported by power cylinder 9. As carriage 14 descends with the pallet stack load, the inclined operating surface 45 of cam 42 will engage the enlarged head 41 of the switch arm and cause same to be swung downwardly for opening of limit switch 39 with consequent deenergization of solenoids 37 whereupon pallet retaining lugs 30, through influence of springs 34 will return to inwardly swung, operative position and engage the second to bottom pallet L' and thereby resume support of the pallet stack. The extent of downward travel of carriage 14 between the engagement of switch arm head 41 with abutment member 46 and with inclined surface 45 of cam 42, or as it were, between switch-closed and switch-opened position, is so predetermined as to cause the lowest pallet to be carried below lugs 30 and to present the second to bottom pallet L' for supported engagement on lugs 30 as the latter are returned inwardly. Limit switch 39 is maintained in open position, as carriage 14 continues its descent by engagement between switch arm head 41 and the vertical operating surface 44 of cam 42 (see Figure 4).

Power cylinder 9 may be of any desired type and the systems of operation of the same may be conventional and are not considered a part of this invention. However, the timing of operation of cylinder 9 must be closely controlled and, for purposes of illustrating same, 47 indicates a compressed air inlet and exhaust line to cylinder 9 which line is connected to a controller, such as a pilot-operated valve (not shown), which is connected by piping 48 to a switch 49 mounted upon post 40 immediately beneath limit switch 39. Switch 49 is adapted for actuation by a short, horizontally disposed lug 50 formed at the lower end of a vertical arm 51 depending from, and fixed at, its upper end to brace member 13. The vertical spacing between lug 50 and abutment member 46 is such that switch 49 will be actuated substantially simultaneously with the closing of limit switch 39 when carriage 14 is in fully elevated position for instituting air exhaustion from cylinder 9 to effect descent of carriage 14. In the event it is desired that cylinder 9 be of the hydraulic type, a snap-acting limit switch of the same character as switch 39 may be mounted on post 40 in lieu of switch 49 for initiating fluid withdrawal; which switch may be actuated by lug 50 of arm 51.

To cause upward travel of carriage 14 from its lower position, as shown in Figure 4, compressed air is fed into cylinder 9 through customary means. Limit switch 39 will remain in open position, as switch arm head 41 travels relatively downwardly along cam surface 44. Said switch 39 remains open until abutment member 46 engages said switch arm head whereby the switch arm is "kicked" into horizontal, circuit-closing position. As stated above, lug 50 will contemporaneously engage switch 49 to bring about release of air from cylinder 9.

With carriage 14 in lowered position and conveyor platform 19 maintained in inclined attitude, by angle members 25, 27, pallet L will slide therealong through gravity and be dispensed from machine A through discharge opening 5, as indicated in Figures 1 and 2. Although not shown, it is obvious that a conveyor system could adjoin machine A for receiving dispensed pallets and conveying same to selected points remote from the machine. Such conveyors could be of any desired type, such as gravity or driven.

The magazine may be easily loaded by the deposition therein of a stack of pallets by means of a fork lift truck with the open rear side permitting ready access to the magazine interior. If desired, the framing of the magazine may be designed to flare outwardly a short distance on all three sides spacedly above the base frame for directing in a funnel manner the lower pallets of the stack. This feature assures that proper alignment will be effected of the lower pallets despite any disarrangement of the pallets in the stack when the same is supplied to the magazine.

The details of construction can be varied without departing from the spirit of the invention and the exclusive use of those modifications coming within the scope of the claims is contemplated.

What we claim and desire to secure by Letters Patent is:

1. A machine for storing and individually dispensing pallets comprising a four-sided base frame, a magazine-defining frame mounted on said base frame for receiving a supply of stacked pallets, pallet-retaining lugs mounted on opposite sides of said base frame for supporting the stack of pallets, said pallet-retaining lugs being mounted for swinging within a horizontal plane between inward or pallet support position and outward or non-support position, a carriage disposed in said base frame, means for moving said carriage upwardly and downwardly, toward and away from, the pallet supply, a lug retracting member provided with each retaining lug for withdrawal of the lugs from pallet support position, a switch mounted in the base frame beneath said carriage and operatively connected to said lug retracting members, a switch-actuating device fixed to said carriage and depending from the lower portion thereof and having an abutment member for engaging said switch to effect retraction of the lugs in timed relation to the arrival of the carriage at the upper limit of its travel; said switch-actuating device further having a cam surface for engaging said switch for a predetermined interval after retraction of said lugs for effecting return of same to pallet support position.

2. A machine for storing and individually dispensing pallets comprising a four-sided base frame, a magazine-defining frame mounted on said base frame for receiving a supply of stacked pallets, pallet-retaining lugs mounted on opposite sides of said base frame for supporting the stack of pallets, said pallet-retaining lugs being mounted for swinging within a horizontal plane between inward or pallet support position and outward or non-support position, a carriage disposed in said base frame, means for moving said carriage upwardly and downwardly, toward and away from, the pallet supply, a lug retracting member provided with each retaining lug for withdrawal of the lugs from pallet support position, a switch mounted in the base frame beneath said carriage and operatively connected to said lug retracting members, guide members depending from the underside of said carriage, a switch-actuating assembly mounted on one of said guide members and comprising an abutment member and a cam having vertical and inclined operating faces.

References Cited in the file of this patent

UNITED STATES PATENTS

| | | |
|---|---|---|
| 986,888 | Zimmerman | Mar. 14, 1911 |
| 1,330,639 | Leumann | Feb. 10, 1920 |
| 1,722,048 | Hill | July 23, 1929 |
| 1,805,029 | Baker | May 12, 1931 |
| 1,849,385 | Sekulski | Mar. 15, 1932 |
| 1,904,198 | Brand | Apr. 18, 1933 |
| 2,338,714 | Garner | Jan. 11, 1944 |
| 2,375,241 | Lindgren et al. | May 8, 1945 |
| 2,458,290 | Monroe | Jan. 4, 1949 |
| 2,602,556 | Sheehan | July 8, 1952 |
| 2,603,372 | Ketchpel | July 15, 1952 |
| 2,633,253 | Martin | Mar. 31, 1953 |
| 2,693,898 | Epperson | Nov. 9, 1954 |

FOREIGN PATENTS

| | | |
|---|---|---|
| 349,298 | Great Britain | May 28, 1931 |